(12) United States Patent
Dahmen et al.

(10) Patent No.: US 7,561,352 B2
(45) Date of Patent: Jul. 14, 2009

(54) EYEPIECE UNIT FOR ENDOSCOPES

(75) Inventors: Jan Dahmen, Seitingen-Oberflacht (DE); Siegfried Hoefig, Muehlheim (DE)

(73) Assignee: Karl Storz GmbH & Co., KG (DE)

( * ) Notice: Subject to any disclaimer, the term of this patent is extended or adjusted under 35 U.S.C. 154(b) by 106 days.

(21) Appl. No.: 11/472,624

(22) Filed: Jun. 22, 2006

(65) Prior Publication Data

US 2006/0291068 A1    Dec. 28, 2006

(30) Foreign Application Priority Data

Jun. 24, 2005    (DE)    ............... 10 2005 029 401

(51) Int. Cl.
*G02B 7/02* (2006.01)
*G02B 23/24* (2006.01)
(52) U.S. Cl. .................... 359/819; 359/435
(58) Field of Classification Search ............ 359/435, 359/819, 701, 703, 737, 763, 434, 643; 600/114, 600/121, 130, 156, 133
See application file for complete search history.

(56) References Cited

U.S. PATENT DOCUMENTS 4,607,620 A    8/1986   Storz .................... 128/4
5,212,595 A    5/1993   Dennison, Jr. et al. ...... 359/513
6,425,857 B1   7/2002   Rudischhauser et al. .... 600/112

FOREIGN PATENT DOCUMENTS

| DE | 237 723 A1 | 7/1986 |
| DE | 197 13 276 A1 | 10/1998 |
| DE | 199 27 631 | 11/2000 |
| DE | 102 56 673 A1 | 6/2004 |
| EP | 1 291 698 | 3/2003 |
| JP | 60-165614 | 8/1985 |

OTHER PUBLICATIONS

German Office Action, Mar. 3, 2006, 4 pages.
European Search Report, Sep. 4, 2006, 10 pages.

*Primary Examiner*—Mohammed Hasan
(74) *Attorney, Agent, or Firm*—St. Onge Steward Johnston & Reens LLC

(57) ABSTRACT

The invention relates to an eyepiece unit with an eyepiece mounted in an eyepiece frame and with a coupling element for inserting the eyepiece frame. According to a first embodiment, the eyepiece is mounted so that it can slide axially in the eyepiece frame and can be fixed so that it is individually adjustable in the eyepiece frame. To ensure an easy and rapid adjustment in an eyepiece unit, it is proposed with the invention that the eyepiece can be fixed in the eyepiece frame without screws. According to a second embodiment, the eyepiece frame is mounted in the coupling element so that it slides perpendicularly to the longitudinal axis for adjustment. It is fixed in this adjustment position, according to the invention, because the eyepiece frame can be fixed in the coupling element without screws.

14 Claims, 2 Drawing Sheets

EYEPIECE UNIT FOR ENDOSCOPES

CROSS-REFERENCE TO RELATED APPLICATIONS

The present application claims priority of German patent application No. 10 2005 029 401.4 filed on Jun. 24, 2005, the content of which is incorporated herein by reference.

FIELD OF THE INVENTION

The invention relates to an eyepiece unit for endoscopes with an eyepiece that has at least one lens system and is mounted in an eyepiece frame, and with a coupling unit, which can be connected with an endoscope housing, for inserting the eyepiece frame.

BACKGROUND OF THE INVENTION

Eyepiece units of this type are known in the art in various embodiments. To adjust the eyepiece in the longitudinal direction of the optical system in the eyepiece frame, on the one hand, and on the other hand to adjust the eyepiece frame, with the eyepiece installed, in the coupling element in the image plane, it is a common practice in the art to secure the components that are to be fixed in each case in the adjusted position by means of screws. This type of adjustment has thoroughly proved itself; yet there is a danger that very fine shavings or similar disruptive particles can separate from the threads that press inward and find their way into the eyepiece unit. In addition, adjustment is very complex and time-consuming.

Consequently it is the object of the invention to create an eyepiece for endoscopes which allows a simple and rapid adjustment.

According to a first embodiment of the invention, in which the eyepiece is mounted in the eyepiece frame so that it can be axially slid and can be secured in an individually adjustable adjustment position in the eyepiece frame, the object of the invention is fulfilled in such a way that the eyepiece can be fixed in the eyepiece frame without screws.

Thanks to the invention's avoidance of screws for fixing the eyepiece in the adjusted position in the eyepiece frame, there is no longer any danger that shavings or similar foreign bodies can enter the eyepiece unit during adjustment.

It is proposed according to the invention that, to secure the screwless fixing, the eyepiece can be fixed in the eyepiece frame by means of a clamping or friction lock. Through clean flat clamping of the components to one another, the two-sided friction forces are so clearly increased that, even without the use of a screw, the component to be fixed can be secured in the adjustment position.

According to a first practical embodiment of the invention, to produce the clamping and/or friction lock it is proposed that in the interior of the eyepiece frame configured as an essentially cylindrical sleeve, at least one clamping element is positioned which reduces the inner diameter of the eyepiece frame, and that this unit, fully installed, interacts with the eyepiece installed in the eyepiece frame, in such a way that at least one clamping element is advantageously configured as an O-ring.

According to a second practical embodiment of the invention, it is proposed that to produce the clamping and/or friction lock the eyepiece frame is configured as an essentially cylindrical clamping sleeve, which when installed clamps and surrounds the inserted eyepiece in such a way that the outer diameter of the eyepiece is slightly larger than the inner diameter of the clamping sleeve. Because of the difference in diameter, the eyepiece frame configured as a clamping sleeve is widened by the insertion of the eyepiece and the eyepiece is clamped and held secure.

To configure the eyepiece frame as a clamping sleeve, this sleeve has according to the invention at least one and preferably three expansion slits running in the axial direction of the eyepiece frame. These expansion slits allow the larger-diameter eyepiece to be inserted into the eyepiece frame.

It is further proposed with the invention that alternatively to fixing the eyepiece by means of clamping and/or friction locks in the eyepiece frame, the fixing can be achieved by magnetic force. Fixing by magnetic force has the advantage of further reducing the danger of material abrasion occurring in the mutual fixing of the components.

In order to be able to adjust the eyepiece frame with the eyepiece mounted in the coupling element in the image plane, it is proposed with the invention that the eyepiece frame is positioned in the coupling element so that it can slide perpendicularly to the longitudinal axis and that it can be fixed in an individually adjustable adjustment position in the coupling element. This adjustment position in the coupling element, according to the invention, is also preferably able to be fixed by means of clamping and/or friction lock or even screwlessly.

The actual connecting of the eyepiece frame with the coupling element is achieved, according to a preferred embodiment of the invention, by a stop mechanism whose parts, both on the eyepiece frame side and on the coupling element side, interact to form a releasable but secure connection.

According to a first practical embodiment of the invention it is proposed that the stop mechanism is configured as a bayonet connection. The configuration as a bayonet connection constitutes a means of connecting that functions simply and quickly, one whose configuration requires no finely cut threads as are found with classic screw-in connections.

According to a second practical embodiment of the invention, it is further proposed that the stopping mechanism is configured on one of the components that are to be connected, as a notching or screw-in sleeve that can be secured on the other respective component. This screw-in sleeve can, for instance, take the form of a screwed cap, which is screwed onto an outer thread on another component. Because both the thread of the screwed cap and the opposite thread for securing the screwed cap are positioned on the outside of the eyepiece unit, there is no danger here that shreddings caused by abrasion can make their way inside the eyepiece unit.

Producing the clamping and/or friction lock required for fixing the eyepiece frame in the adjustment position occurs, according to the invention, by means of at least one pressure element mounted in the coupling element, by means of which the end surfaces of the eyepiece frame and of the coupling element that are coupled together by the stop mechanism can be pressed against one another.

It is proposed with a first practical embodiment of the invention that the pressure element takes the form of an O-ring mounted in the coupling element.

According to an alternative embodiment of the invention, the pressure element takes the form of a spring element mounted in the coupling element, which spring element can advantageously serve, in addition, as a length adjustment when the endoscope is under thermal and/or mechanical pressure.

It is further proposed with the invention that alternatively to fixing the eyepiece frame by means of clamping and/or friction lock in the coupling element, the fixing can occur by magnetic force. The fixing by magnetic force has the advantage of reducing the risk of material abrasion occurring in mutual fixing of the components.

SUMMARY OF THE INVENTION

The object of the invention is fulfilled according to a second embodiment of the invention in which the eyepiece frame is positioned so that it can slide perpendicularly to the longitudinal axis in the coupling element and can be fixed in an individually adjusted adjustment position in the coupling element, distinguished in that the eyepiece frame can be fixed in the coupling element without screws.

Thanks to the invention's avoidance of screws for fixing the eyepiece frame in the adjustment position in the coupling element, there is no longer any danger that shreddings or similar foreign bodies make their way into the eyepiece unit during adjustment.

It is finally proposed with the invention that the components—the eyepiece and eyepiece frame on the one hand, and/or the eyepiece frame and coupling element on the other hand—can in addition be fixed in the respective adjustment position by means of a cementing material, to prevent unintentional displacement of the components even with stronger mechanical pressure on the eyepiece unit Additional characteristics and advantages of the invention can be seen from the related drawings, in which three embodiments of an eyepiece unit for endoscopes according to the invention are depicted in schematic manner.

DETAILED DESCRIPTION OF THE INVENTION

The eyepiece units for endoscopes illustrated in FIGS. 1 through 5 consist essentially of an eyepiece 3, which includes at least one lens system 2 and is mounted so that it can slide axially in an eyepiece frame 4, and of a coupling element 5 for inserting the eyepiece frame 4, which coupling element 5 can be connected with an endoscope housing.

Figure 3:
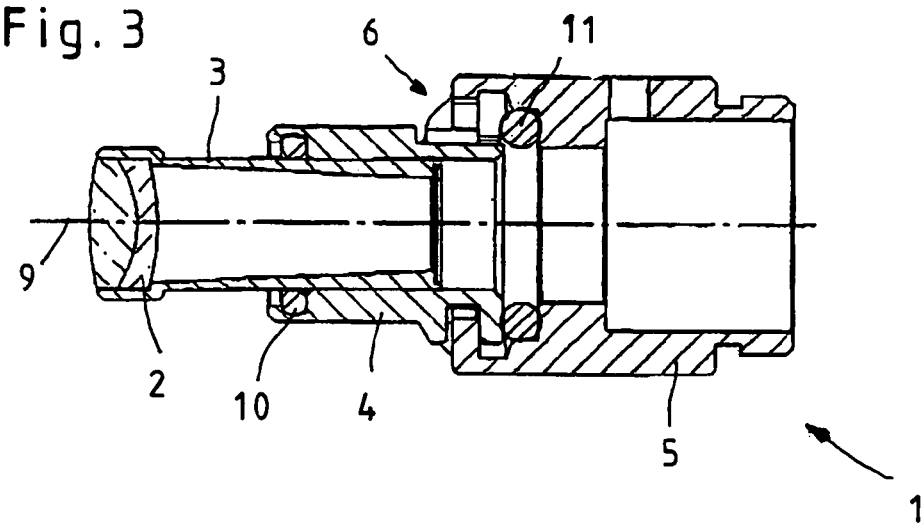
FIG. 3 shows a longitudinal section through the eyepiece of FIG. 2.
Figure 4:
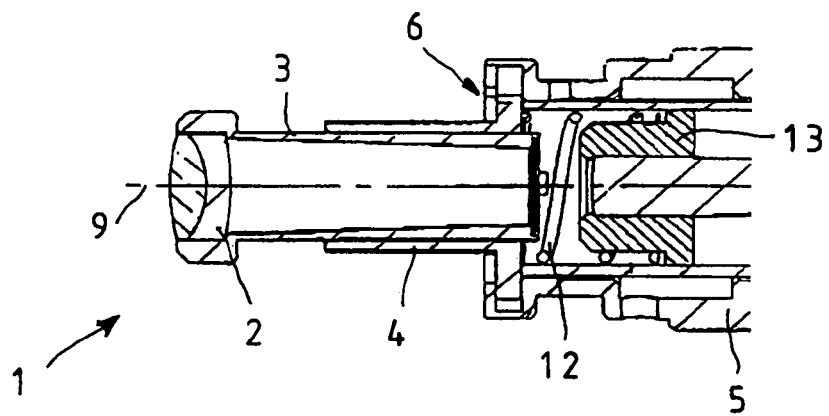
FIG. 4 shows a longitudinal section through a second embodiment of an eyepiece unit for endoscopes according to the invention.
Figure 5:
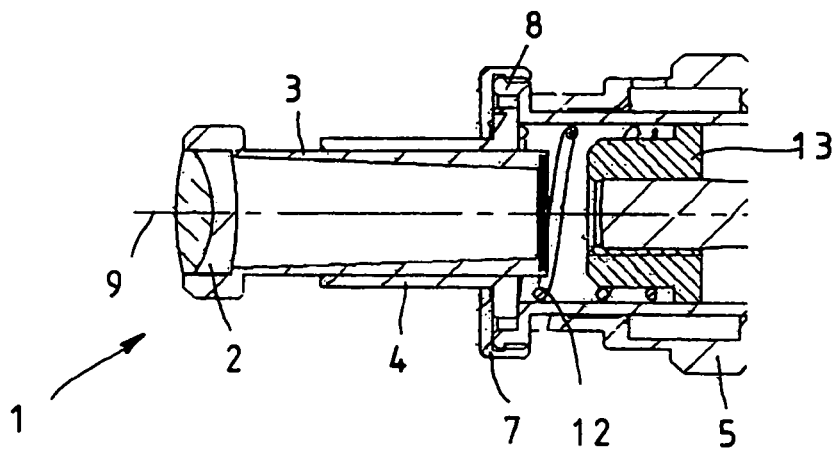
FIG. 5 shows a longitudinal section through a third embodiment of an eyepiece unit for endoscopes according to the invention.

As can be seen in particular from FIGS. 3, 4, and 5, the eyepiece frame 4 takes the form of an essentially cylindrical sleeve into which the likewise cylindrical-shaped eyepiece 3 can be inserted.

The eyepiece frame 4 is secured in the coupling element 5 by means of a stop mechanism, which takes the form of a bayonet connection 6 in the two embodiments shown in FIGS. 1 to 4.

In the third embodiment, shown in FIG. 5, for configuring the stop mechanism, this mechanism is configured as a screw-in sleeve 7. The screw-in sleeve 7 here takes the form of a screwed cap positioned on the eyepiece frame 4, and this screwed cap can be screwed onto an outer thread 8 on the coupling element 5. It is also possible to position the screwed cap on the coupling element 5, where the cap can be screwed onto an outer thread 7 on the eyepiece frame 4.

Alternatively to the configuration of the stop mechanism as a screw-in sleeve 7, it is also possible to present the stop mechanism as a catching sleeve, which is positioned on one of the two components—the eyepiece frame 4 or the coupling element 5—that are to be connected to one another, so that the catching sleeve is inserted in a catch recess on the other corresponding component.

After inserting the eyepiece 3 into the eyepiece frame 4 and connecting the eyepiece frame 4 with the coupling element 5 by the stop mechanism, it is necessary to adjust the eyepiece unit 1. The eyepiece 3 is adjusted in the longitudinal direction of the optical system by manually sliding the eyepiece in the eyepiece frame 4. Adjustment in the image plane is done by sliding the eyepiece frame 4 in the coupling element 5 perpendicularly to the longitudinal axis 9 of the eyepiece unit 1.

To prevent the mutually adjusted components from being displaced again during handling of the endoscope, it is necessary to fix the components with respect to one another in the respective adjustment position.

Figure 1:
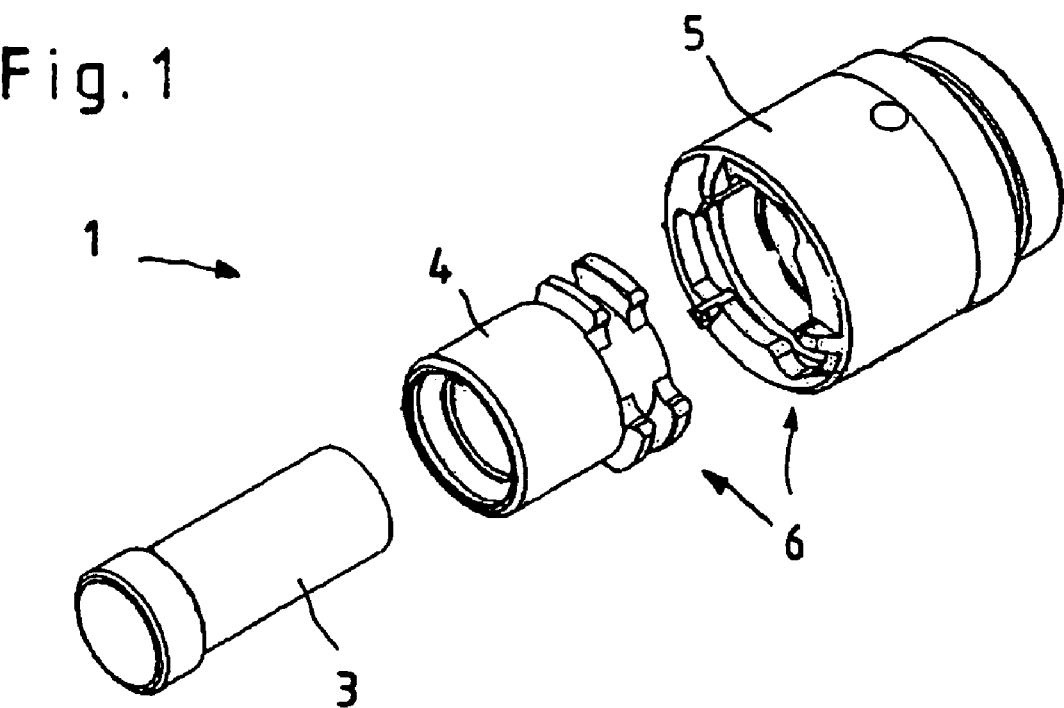
FIG. 1 shows a perspective view of a first embodiment of an eyepiece unit for endoscopes according to the invention, in the non-installed state.
Figure 2:
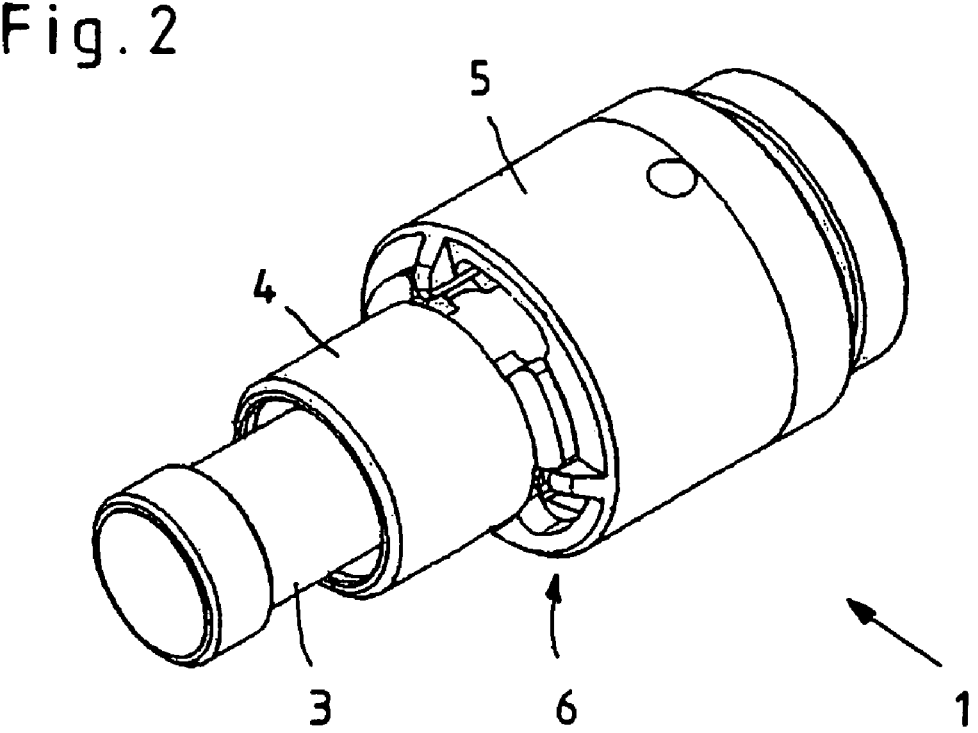
FIG. 2 shows a perspective view of the eyepiece from FIG. 1 in installed state.

In the first embodiment, illustrated in FIGS. 1 to 3, the eyepiece 3 is fixed within the eyepiece frame 4 by a clamping element, which reduces the inner diameter of the eyepiece frame 4 and which is configured in the illustrated embodiment as an O-ring. The shapable O-ring 10, preferably consisting of a rubber material, is compressed during insertion of the eyepiece 3 into the eyepiece frame 4 and exerts a radial clamping force on the eyepiece 3. From this clamping force and the friction forces between the O-ring 10 and the outer surface of the eyepiece 3, the eyepiece 3 is fixed in its adjusted position within the eyepiece frame 4.

An alternative manner of fixing the eyepiece 3 in the eyepiece frame 5 is illustrated in FIGS. 4 and 5. In these two embodiments the eyepiece frame 4 takes the form of a clamping sleeve, which when installed surrounds and clamps the inserted eyepiece 3, so that the outer diameter of the eyepiece 3 is slightly greater than the inner diameter of the clamping sleeve. In order to configure the eyepiece frame 4 as a clamping sleeve, the sleeve has at least one and preferably three expansion slits running in the axial direction of the eyepiece frame 4. When the larger-diameter eyepiece 3 is inserted into the eyepiece frame 4, these expansion slits widen, allowing the eyepiece 3 to be inserted.

It is decisive for all embodiments that the fixing of the eyepiece 3 in the adjustment position within the eyepiece frame 4 occurs without screws, entirely through clamping and/or friction lock. This type of fixing, as opposed to the fixing screws customary in the art with their inner-directed threads, has the advantage that no abraded particles, such as thread shreddings, can find their way into the interior of the eyepiece unit 1.

In order to fix the adjustment position, even against forceful mechanical impacts, it is also possible to apply cementing material on the connecting areas, for instance in the area of the O-ring 10 or the expansion slits.

With respect to the mounting of the eyepiece frame 4 in the coupling element 5, it is also essential to fix the components in the respective adjustment position with respect to one another.

In all three of the illustrated embodiments, the eyepiece frame 4 is fixed in the coupling element 5 by means of a pressure element positioned in the coupling element 5, so that the end surfaces of the eyepiece frame 4 and of the coupling element 5 that are coupled together by means of the stop mechanism are pressed against one another.

This pressure element, in the first embodiment illustrated in FIGS. 1 to 3, takes the form of an O-ring mounted in the coupling element 5. To connect the eyepiece frame 4 with the coupling element 5, in this embodiment the two components 4 and 5 that are to be connected to one another are set against one another and twisted to one another by applying an axial pressure force until the end surfaces of the components 4 and 5, which form the bayonet connection 6, link to one another. The axial pressure force is necessary in order to press the O-ring 11 together.

As can be seen from the sectional views in FIGS. 3, 4, and 5, the eyepiece frame 4 when installed always has sufficient radial play so that it can be pushed perpendicularly to the longitudinal axis 9 of the eyepiece unit 1 in the coupling element 5.

Compression of the O-ring 11 has the effect that, when the O-ring 11 expands again, the end surfaces of the eyepiece frame 4 and of the coupling element 5, which have been coupled together by the stopping mechanism, are pressed against one another. From this clamping force, and from the frictional forces between the abutting end surfaces, the eyepiece frame 4 is fixed in the adjusted position within the coupling element 5.

An alternative manner of fixing the eyepiece frame 4 in the coupling element 5 is presented in FIGS. 4 and 5. In these two embodiments, the pressure element takes the form of a spring element 12 mounted in the coupling element 5.

In the second embodiment, illustrated in FIG. 4, to connect the eyepiece frame 4 with the coupling element 5 the two components 4 and 5, which are to be connected to one another, are set against one another and are turned together by applying an axial pressure force until the end surfaces of the components 4 and 5, which form the bayonet connection 6, link to one another. The axial pressure force is essential in order to compress the spring element 12.

In the third embodiment, illustrated in FIG. 5, to connect the eyepiece frame 4 with the coupling element 5 the two components 4 and 5, which are to be connected to one another, are set against one another and then the screw-in sleeve 7 mounted on the eyepiece frame 4 is screwed onto the outer thread 8 of the coupling element 5. By tightening the screw-in sleeve 7, the two components 4 and 5 are forced together and the spring element 12 is compressed.

Compression of the spring element 12 has the effect in both cases that the end surfaces of the eyepiece frame 4 and of the coupling element 5, which are coupled together by means of the stop mechanism, are pressed together by the spring tension of the spring element 12. Through this clamping force, as well as the friction forces between the abutting surfaces, the eyepiece frame 4 is fixed in the adjusted position within the coupling element 5.

The eyepiece 4 is also fixed in the adjustment position within the coupling element 5 without screws, entirely from clamping and/or friction lock.

In order also to fix this adjustment position against rough mechanical impact it is also possible to apply cementing material on the connecting areas.

In addition to the production of the pressure force which fixes the components 4 and 5 in the adjustment position, the spring element 12, in collaboration with a guide 13 mounted in the coupling element 5, serves simultaneously as a length adjustment when the endoscope is under thermal and/or mechanical pressure.

What is claimed is:

1. An eyepiece unit for endoscopes, with an eyepiece that has at least one lens system and is mounted in an eyepiece frame so that it can slide axially and can be fixed in the eyepiece frame in an individually adjustable adjustment position, and with a coupling element, which can be connected with an endoscope housing, for inserting the eyepiece frame, wherein the eyepiece frame is mounted in the coupling element so that it can slide perpendicularly to the longitudinal axis of the eyepiece unit and can be fixed in an individually adjustable adjustment position in the coupling element, characterized in that the eyepiece can be fixed in the eyepiece frame without screws by means of clamping and/or friction lock for adjustment in the longitudinal direction of the optical system and in that the eyepiece frame can be fixed in the coupling element without screws by means of clamping and/or friction lock for adjustment in the image plane.

2. An eyepiece unit according to claim 1, characterized in that inside the eyepiece frame, which is configured as an essentially cylindrical sleeve, at least one clamping element is configured which reduces the inner diameter of the eyepiece frame and when installed interacts with the eyepiece inserted into the eyepiece frame.

3. An eyepiece unit according to claim 2, characterized in that the at least one clamping element takes the form of an O-ring.

4. An eyepiece unit according to claim 1, characterized in that the eyepiece frame, in order to configure the clamping sleeve, has at least one and preferably three expansion slits running in the axial direction of the eyepiece frame.

5. An eyepiece unit according to claim 1, characterized in that the eyepiece can be fixed in the eyepiece frame by means of magnetic force.

6. An eyepiece unit according to claim 1, characterized in that the eyepiece frame can be secured on the coupling element by means of a stopping mechanism.

7. An eyepiece unit according to claim 6, characterized in that the stopping mechanism takes the form of a bayonet connection.

8. An eyepiece unit according to claim 6, characterized in that the stopping mechanism takes the form of a catching or screwing sleeve that is mounted on one of the components that are to be connected to one another and can be secured on the respective other component.

9. An eyepiece unit according to claim 6, characterized in that, to configure the clamping and/or friction lock, at least one pressure element is positioned in the coupling element, so that by means of this pressure element the end surfaces of the eyepiece frame and of the coupling element, which are coupled to one another by the stopping mechanism, can be pressed against one another.

10. An eyepiece unit according to claim 9, characterized in that the at least one pressure element can be configured as an O-ring mounted in the coupling element.

11. An eyepiece unit according to claim 9, characterized in that the at least one pressure element can be configured as a spring element mounted in the coupling element.

12. An eyepiece unit according to claim 11, characterized in that the spring element additionally serves to compensate for thermal and mechanical changes in length.

13. An eyepiece unit according to claim 1, characterized in that the components—the eyepiece and eyepiece frame on the one hand and/or the eyepiece frame and coupling element on the other hand—can additionally be fixed in the particular adjustment position by means of a cementing material.

14. An eyepiece unit according to claim 1, characterized in that the eyepiece frame takes the form of an essentially cylindrical clamping sleeve, which when installed surrounds and clamps the inserted eyepiece so that the outer diameter of the eyepiece is slightly greater than the inner diameter of the clamping sleeve.

* * * * *